United States Patent [19]
Seaman et al.

[11] Patent Number: 5,468,913
[45] Date of Patent: Nov. 21, 1995

[54] ELECTRO-OPTICAL COAXIAL TOW CABLE

[75] Inventors: Peter E. Seaman, Niantic; Thomas R. Stottlemyer, Mystic, both of Conn.

[73] Assignee: The United States of America as represented by the Secretary of the Navy, Washington, D.C.

[21] Appl. No.: 387,000

[22] Filed: Feb. 9, 1995

Related U.S. Application Data

[63] Continuation of Ser. No. 110,256, Aug. 19, 1993, abandoned.

[51] Int. Cl.$^6$ .............................. G02B 6/44; H01B 7/18; H02G 3/00
[52] U.S. Cl. .......................... 174/102 R; 174/96; 174/97; 385/101; 385/104; 385/107
[58] Field of Search .................................. 174/95, 96, 97, 174/98, 102 R, 103, 104, 108; 385/101, 104, 107

[56] References Cited

U.S. PATENT DOCUMENTS

| | | | |
|---|---|---|---|
| 4,118,594 | 10/1978 | Arnaud . | |
| 4,141,623 | 2/1979 | Dubost . | |
| 4,156,104 | 5/1979 | Mondello | 174/70 R |
| 4,158,478 | 6/1979 | D'Auria . | |
| 4,359,598 | 11/1982 | Dey | 174/40 R |
| 4,422,889 | 12/1983 | Trezeguet | 156/70 |
| 4,484,963 | 11/1984 | Anctil | 156/56 |
| 4,548,664 | 10/1985 | Canivet | 156/166 |
| 4,623,218 | 11/1986 | Laurette . | |
| 4,671,611 | 6/1987 | Allemand | 350/96.23 |
| 5,224,190 | 6/1993 | Chu | 385/107 |
| 5,274,725 | 12/1993 | Bottoms | 385/105 |

FOREIGN PATENT DOCUMENTS

| | | | |
|---|---|---|---|
| 2501407 | 9/1982 | France | 385/101 |
| 53-16887 | 2/1978 | Japan | 385/101 |
| 54-1643 | 8/1979 | Japan | 385/101 |
| 57-5010 | 1/1982 | Japan | 385/101 |
| 2227855 | 8/1990 | United Kingdom | 385/101 |

*Primary Examiner*—Michael W. Phillips
*Assistant Examiner*—Stephen T. Ryan
*Attorney, Agent, or Firm*—Michael J. McGowan; Prithvi C. Lall; Michael F. Oglo

[57] ABSTRACT

A marine tow cable has both coaxial electronic and fiber optic data transmission capabilities wherein the coaxial core conductors are positioned at the neutral axis or center line of the cable with the coaxial shield conductor circumscribing a dielectric material therebetween. Embedded within the dielectric material matrix, separating the core conductors and the shield conductor, are fiber optic transmitters helically circumscribing the core conductors. Surrounding the electro-optical assembly is a watertight jacket and a protective armor cover to carry the tensile forces imparted to the cable during towing operations.

4 Claims, 4 Drawing Sheets

ELECTRO-OPTICAL COAXIAL TOW CABLE

STATEMENT OF GOVERNMENT INTEREST

The invention described herein may be manufactured and used by or for the Government of the United States of America for governmental purposes without the payment of any royalties thereon or therefore. This application is a continuation of application Ser. No. 08/110,256, filed 19 Aug. 1993, now abandoned.

BACKGROUND OF THE INVENTION

(1) Field of the Invention

The present invention relates to a marine tow cable and more specifically to a marine tow cable incorporating therein both a coaxial electronic communications cable and one or more fiber optic transmitter elements. Such cables are commonly referred to as electrical-optical-mechanical (EOM) tow cables. EOM tow cables are in common use by surface and/or undersea watercraft to tow scientific data sensing and/or recording instrument packages or military surveillance and/or enemy detection equipment. The instrument packages not only require that the cable withstand varying tensile forces imparted thereto by the hydrodynamic drag of the instrument package vehicle under tow but also incorporate a secure communication link with the towing craft.

(2) Description of the Prior Art

Prior art EOM cables generally position the fiber optic transmitters about the axial center line of the cable and surrounded by a protective metal tube thereby requiring that the core conductors, or the electronic coax, be placed outside the metal tube. This type of structure does not provide for a minimum cable diameter as will be further appreciated herein below.

Because glass fibers are by nature almost inextensible, it is undesirable to orient optical fibers axially within a cable, such as an EOM cable, wherein the cable is constantly subjected to cyclic stretching and contracting forces imparted thereto during towing operations. As the elastic components of the tow cable stretch, under towing forces, the optic fibers will be subjected to tensile loads. Although glass fibers exhibit great mechanical strength properties when in tension, because they are less extensible than the other cable components, glass fibers will catastrophically fail, without warning, upon reaching their extension limit. Further, under compressive loading, their performance is degraded by buckling and microbending. Thus, as the tow cable is wound upon a storage drum and/or passes over guide pulleys while being wound in or out, bending forces will be imparted to the tow cable thereby subjecting any optical fibers on the inside bend radius, or compressed side of the curved cable, to undesirable compressive forces and possible buckling failure.

SUMMARY OF THE INVENTION

The disadvantages of the prior art EOM cables are overcome by the present invention. An EOM cable structure, of minimum diameter, is taught wherein the fiber optic transmitter elements are not subjected to the tensile towing forces nor the compressive bending forces imparted to the cable during winding operations.

An EOM cable structure is disclosed wherein the coaxial core conductors are placed at the center of the tow cable and the fiber optic transmitters are helically wound about the coaxial core conductors and within a dielectric material matrix. Thus, for given electronic parameters, the coaxial shield conductors may be placed at a minimum radial distance from the cable center line, resulting in an EOM tow cable having a minimum diameter.

Accordingly it is an object of the present invention to provide an EOM tow cable having a minimum diameter.

It is a further object of the present invention to provide an EOM tow cable wherein the fiber optic transmitter elements are not subjected to the tensile towing forces.

It is still a further object of the present invention to provide an EOM tow cable wherein the cable may be wound upon a storage drum of minimum diameter and/or passed over guide pulleys having a minimum diameter without applying damaging tensile and/or compressive forces to the fiber optic transmitter elements.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
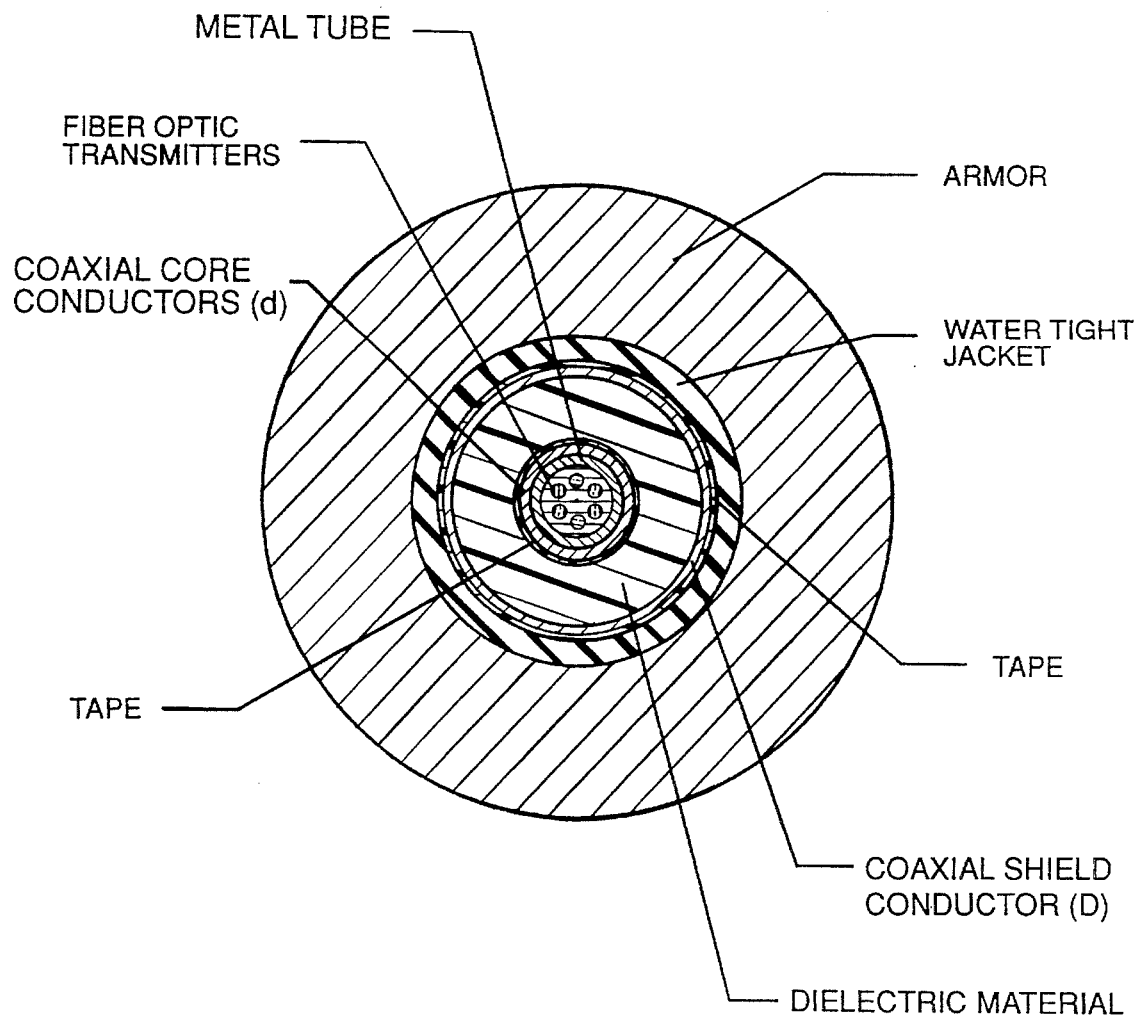
FIG. 1 presents a typical cross-section of a prior art EOM tow cable.

A typical prior art EOM tow cable is illustrated in FIG. 1 wherein the fiber optic transmitters are uniformly spaced about the cable's axial center line and inside a protective metal tube. The coaxial core conductors, shown generally as metal crosshatching, are placed around the metal tube and overwrapped with a protective tape. A dielectric material typically separates the core conductors from the circumscribing coaxial shield conductor which is also overwrapped with a protective tape. The above described composite cable is further provided a circumscribing watertight jacket and an outer load bearing and protective armor covering for carrying the tensile and compressive loads experienced during operational use.

To minimize attenuation, it is desired that the ratio of the coaxial shield diameter D, to the core diameter d, lie between 2.0 and 3.6, with the higher value representing better coaxial performance. In the typical prior art construction, as described above, wherein the core conductors must necessarily be wrapped around the metal tube, the minimum coaxial core diameter d, is controlled by the outside diameter of the tube circumscribing the fiber optic transmitters. Therefore, for a given wire gauge, the coaxial shield diameter D will be larger than if the coaxial core conductors were placed at the center of the tow cable. Thus, the overall tow cable diameter, for given tow cable parameters, is likewise larger than if the core conductors were placed at the axial center line of the cable structure. In an EOM tow cable structure it is most desirable to minimize the overall diameter of the cable so that the overall size and weight of system hardware such as the winding drum, guide pulleys, etc., may also be minimized.

Figure 2:
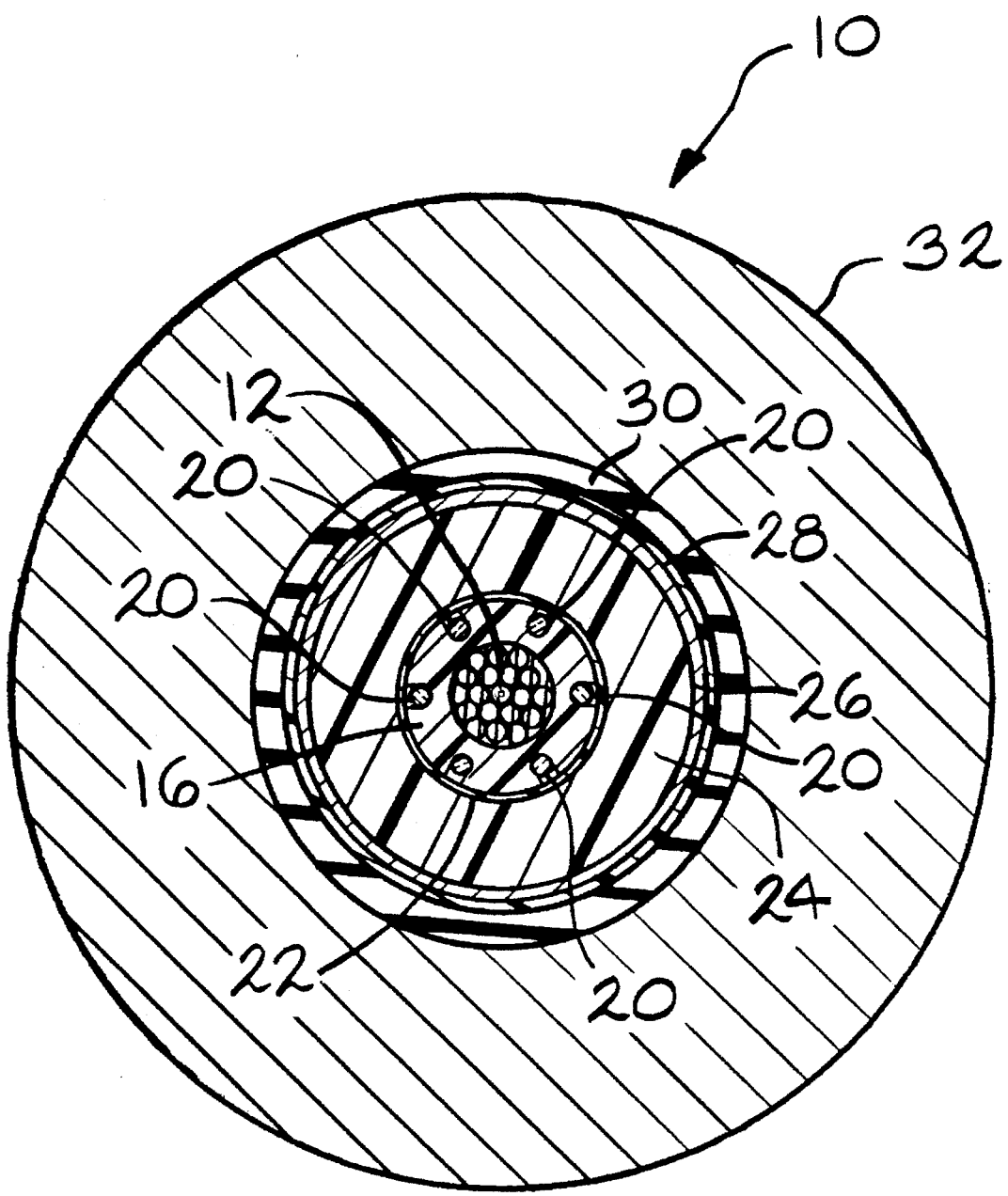
FIG. 2 is a cross-sectional view of an EOM tow cable according to the present invention.
Figure 3:
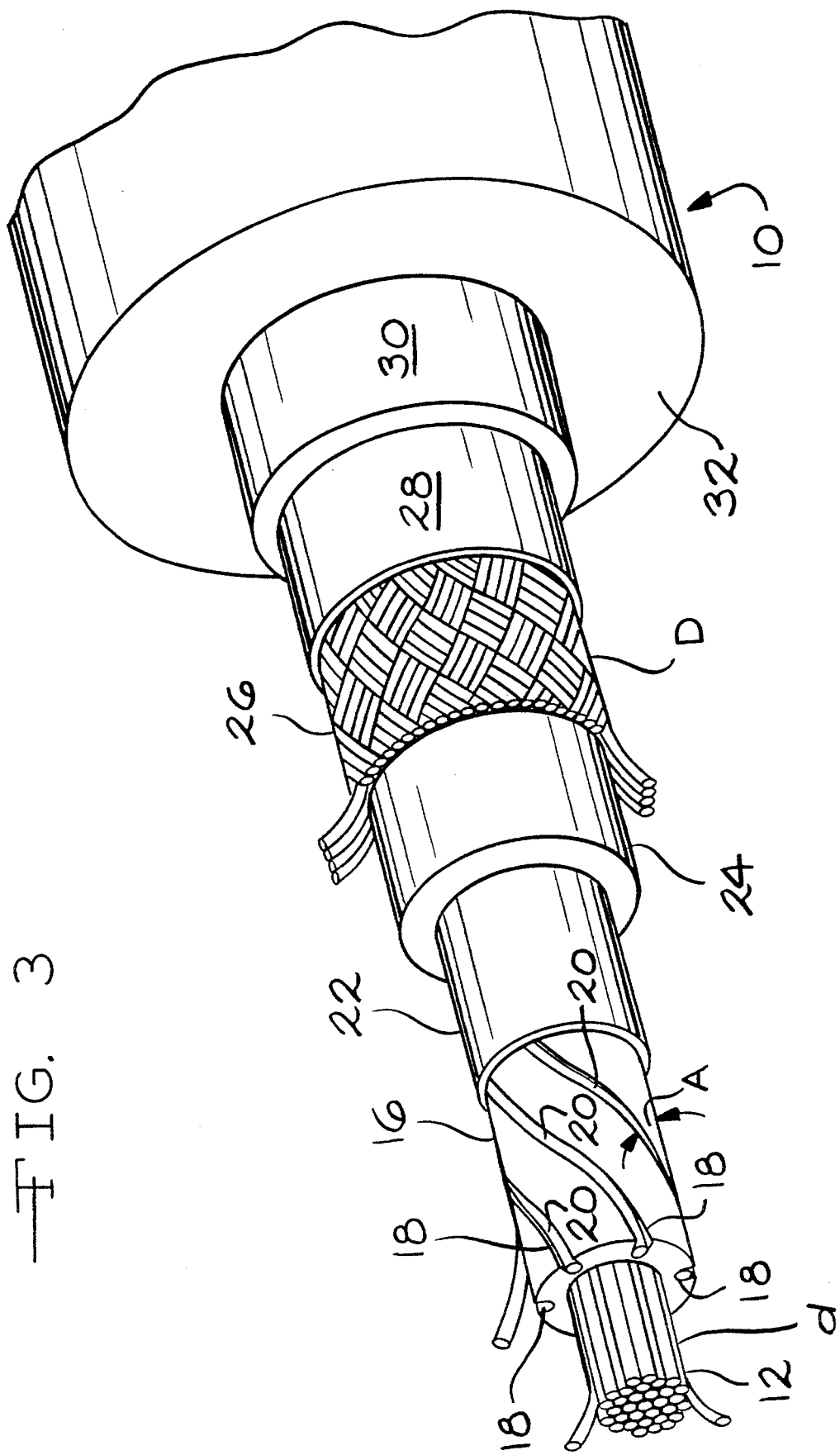
FIG. 3 illustrates a length of cable, according to the present invention, with successive layers of the cable removed to reveal underlying layers and elements.

Referring now to FIGS. 2 and 3, an improved EOM tow cable 10 according to the present invention is illustrated wherein a plurality of round coaxial core conductors 12 are grouped together at the center of the cable and uniformly distributed about the cable center line. Circumscribing the core conductors 12 is a first extruded layer of dielectric material 16. Cut into the outside cylindrical surface of dielectric layer 16 are helical grooves 18 traversing the full length of dielectric layer 16. Fiber optic transmitters 20 are placed within the helical grooves 18. The preferred helix angle "A" must necessarily be determined by taking into consideration the physical and functional characteristics of the cable. These characteristics will necessarily be dictated by the specific cable application and the mechanical properties of the dielectric material. The specific function and attributes of the helically wrapped fiber optic transmitters, in an EOM tow cable application, will be further explained hereinafter.

Wrapped about the conductor and fiber optic transmitter assembly is a layer of protective tape 22 bridging the helical grooves 18 with the fiber optic transmitters therein, thereby constraining the fiber optic transmitters 20 within helical grooves 18. The enclosure formed by the combination of the helical grooves 18 and the overlying tape 22 is such that the fiber optic transmitters 20 preferably lie wholly within the helical grooves, free to move therein. A second layer of dielectric material 24 is extruded over tape 22, thereby providing additional dielectric material between protective tape layer 22 and the coaxial shield conductor 26.

The tape overwrap 22 serves two basic functions: (1) it prevents the heat caused by extrusion of the second dielectric layer 24 from damaging the fiber optic transmitters 20 by forming a protective barrier of entrapped air or gel-like material within helical grooves 18, and (2) the tape 22, in combination with helical grooves 18, forms a cavity within which the fiber optic transmitters 20 may freely move when the EOM tow cable 10 is subjected to the tensile and compressive forces imparted thereto during operational use.

Therefore, the overwrapping tape 22 must necessarily have a higher melting point than that of the molten dielectric material 24 and exhibit a low dielectric constant so that the optimum coaxial performance of the cable is not adversely affected.

As will be appreciated, the above described structure comprises a coaxial cable 10 construction having fiber optic transmitter elements 20 positioned within a dielectric matrix. The purpose of helical grooves 18 is to appropriately locate and retain the fibers at a desired location within the dielectric matrix during manufacture of the cable and provide a conduit circumnavigating the core conductors 12 within which the fiber optic transmitters may lie.

Wrapped about the second dielectric layer 24 is the coaxial shield conductor 26, a second protective tape layer 28 with a circumscribing watertight jacket 30, and an outer, load bearing, armor layer 32, serving also to provide external protection for the cable.

As will be appreciated by the above described structure the diameter D of the coaxial shield 26, for given cable parameters, will be considerably less than that of the prior art cable as described in FIG. 1. Thus, for a given ratio of coaxial shield diameter D to core diameter d, the overall diameter of the EOM tow cable will be minimized. Compare, for example, FIG. 1 and FIG. 2, which are drawn to the same enlarged scale for illustrative purposes. The tow cables of FIG. 1 and FIG. 2 have the same outside diameter and equal outside armor layers. Thus the cables of both figures will have equal tow strength. However, the ratio D/d for the prior art cable of FIG. 1 is approximately 2.0 while the ratio of D/d for the cable of FIG. 2, built in accord with the present invention, is approximately 3.5. Thus it is immediately apparent that, for a given tow cable size, the electronic coaxial performance will be maximized by the teachings of the present invention; and, for a given coaxial performance requirement, the overall size of the tow cable may be reduced. Either way you look at the present invention, coaxial performance and physical size of an EOM tow cable may be optimized.

Figure 4:
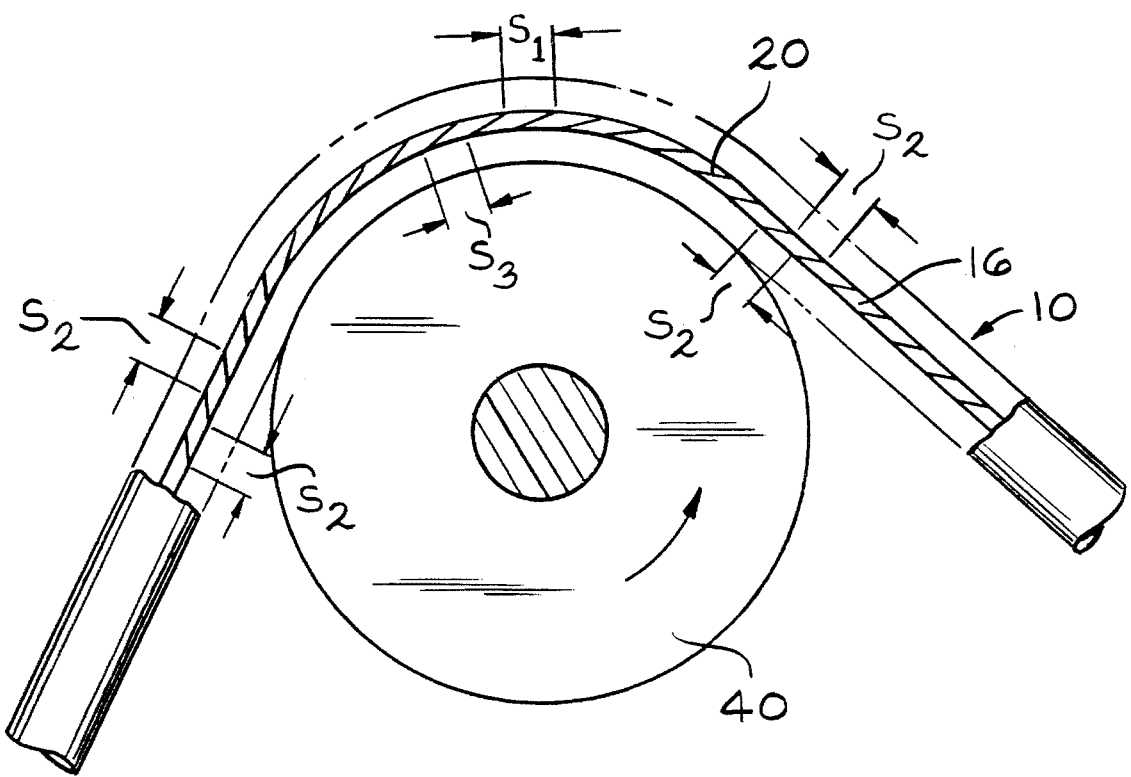
FIG. 4 is a schematic illustration of an EOM cable, in accord with the present invention, traversing a pulley and illustrating how the helically wound fiber optic transmitters behave as the cable is subjected to bending.

FIG. 4 presents a schematic illustration of a cable constructed in accord with the teachings of the present invention, which illustrates how the helically wound fiber optic transmitters 20 behave as cable 10 bends while passing over a typical pulley 40. Assume, for purposes of discussion, that cable 10 is moving from right to left as viewed in FIG. 4. As EOM cable 10 approaches pulley 40, the spacing between adjacent wraps of fiber optic transmitter 20 is represented by the distance $S_2$. When, as illustrated in FIG. 4, cable 10 is straight and approaching pulley 40, the distance between adjacent wraps of fiber optic transmitter 20 is constant at $S_2$. Upon bending around pulley 40, the distance between adjacent wraps on the inside radius of dielectric layer 16 may be expected to compress so that distance $S_2$ reduces slightly to $S_3$. However, at its outside radius, the dielectric layer 16 will be in tension, and distance $S_2$ will stretch to a slightly increased distance $S_2$, as illustrated in FIG. 4 The fiber optic transmitter 20 will move in the helical groove to balance the compressive load at the inner radius and the tensile load at the outer radius. As cable 10 returns to its straight configuration upon leaving pulley 40, the distance between adjacent wraps of transmitter 20 returns to a constant $S_2$.

Thus it is apparent that, unlike the prior art cable illustrated in FIG. 1, the fiber optic transmitters 20 circumnavigating dielectric layer 16, as taught herein, will be free of any tensile or compressive loading when passing over a pulley, such as pulley 40, or otherwise bent during operational use. Of equal or perhaps greater importance, as cable 10 is subjected to towing tensile forces thereby elongating or stretching cable 10, the adjacent wraps of the fiber optic transmitter will stretch in the manner of an coil spring, thereby preventing the fiber optic transmitter from being subjected to the same tensile loads applied to the cable. Thus breakage of the fiber optic transmitter, due to tensile loading, is for all practical purposes eliminated.

In light of the above, it is therefore understood that within the scope of the appended claims, the invention may be practiced otherwise than as specifically described.

What is claimed is:

1. An electro-optical tow cable, comprising:

a plurality of round core conductors for transmitting electrical communication signals, said core conductors being grouped at the center of said cable and substantially uniformly distributed about a center line of said cable;

a first layer of dielectric material circumscribing said core conductors, said first layer of dielectric material having in a peripheral surface thereof a helical groove having a rounded bottom;

at least one round fiber optic transmitter disposed within said groove adjacent said bottom of said groove and circumscribing said core conductors and extending the axial length of said tow cable;

a first layer of protective tape wrapped around said first dielectric layer, said groove and said tape cooperating to form a passageway containing therein said fiber optic transmitter, said fiber optic transmitter being free to move within said passageway;

a second layer of dielectric material extruded onto said tape and abutting and circumscribing said first layer of protective tape;

a coaxial shield abutting and circumscribing said second dielectric layer; and a second layer of protective tape wrapped around and abutting and circumscribing said coaxial shield.

2. The electro-optical tow cable of claim 1 wherein a watertight jacket abuts and circumscribes said second layer of protective tape, and a load-bearing solid armor layer abuts and circumscribes said jacket.

3. A method of manufacturing a combined electronic and fiber optic tow cable comprising the steps of:

providing a plurality of round electronic communications cables, said cables being grouped at the center of said tow cable and substantially uniformly distributed about a center line of said tow cable;

extruding onto said communications cables a first layer of dielectric material circumscribing said communications cables;

cutting helical grooves with rounded bottoms in the outer surface of said first dielectric layer, said grooves being independent of one another and extending substantially the full length of said tow cable;

placing within each of said helical grooves at least one round fiber optic transmitter, said fiber optic transmitter being adjacent said groove rounded bottom;

wrapping a first layer of protective tape on said first dielectric layer and covering said helical grooves, thereby forming a helically extending conduit circumscribing said first dielectric layer, traversing substantially the full length of said tow cable and having said fiber optic transmitter enclosed therein;

extruding a second layer of dielectric material onto said first layer of protective tape;

applying circumferentially onto said second layer of dielectric material a coaxial shield conductor; and wrapping a second layer of protective tape on said coaxial shield conductor.

4. The method as claimed in claim 3 including the additional steps of applying to and circumscribing said protective cover with a watertight jacket, and providing thereover and thereon a tensile load carrying solid armor layer.

* * * * *